(12) United States Patent
Ramanath et al.

(10) Patent No.: US 10,341,215 B2
(45) Date of Patent: *Jul. 2, 2019

(54) METHODS, SYSTEMS, AND COMPUTER READABLE MEDIA FOR EMULATING NETWORK TRAFFIC PATTERNS ON A VIRTUAL MACHINE

(71) Applicant: KEYSIGHT TECHNOLOGIES SINGAPORE (HOLDINGS) PTE. LTD., Singapore (SG)

(72) Inventors: Avinash Ramanath, Valencia, CA (US); Sergey Lvov, Woodland Hills, CA (US); Gheorghe Mihai Puchiu, Oxnard, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 98 days.

This patent is subject to a terminal disclaimer.

(21) Appl. No.: 15/092,575

(22) Filed: Apr. 6, 2016

(65) Prior Publication Data

US 2017/0295084 A1 Oct. 12, 2017

(51) Int. Cl.
*H04L 12/26* (2006.01)

(52) U.S. Cl.
CPC .......... *H04L 43/50* (2013.01); *H04L 43/0876* (2013.01); *H04L 43/0817* (2013.01)

(58) Field of Classification Search
CPC . H04L 43/50; H04L 63/1416; H04L 41/5009; H04L 43/08; H04L 41/0896;
(Continued)

(56) References Cited

U.S. PATENT DOCUMENTS 5,812,780 A 9/1998 Chen et al.
6,542,854 B2 4/2003 Yang et al.
(Continued)

FOREIGN PATENT DOCUMENTS

WO WO 2011/002578 A1 1/2011
WO WO 2014/160660 A1 10/2014
WO WO 2015/023369 A1 2/2015

OTHER PUBLICATIONS

Final Office Action for U.S. Appl. No. 14/224,024 (dated Jun. 15, 2016).
(Continued)

*Primary Examiner* — Backhean Tiv
*Assistant Examiner* — Linh T Nguyen (57) ABSTRACT

Methods, systems, and computer readable media for emulating network traffic patterns on a virtual machine are disclosed. In one example, the method includes generating a user specification based on a plurality of network traffic patterns and computer processing usage patterns and receiving, at a virtual machine hosted by a DUT, the user specification containing the plurality of network traffic patterns and computer processing usage patterns. The method further includes generating a plurality of network traffic sequences based on the plurality of network traffic patterns and a plurality of computer processing usage pattern instruction sequences based on the plurality of computer processing usage patterns. The method also includes distributing each of the plurality of network traffic sequences among a plurality of virtual network interface cards (VNICs) and distributing each of the plurality of computer processing usage pattern instruction sequences among a plurality of virtual processing cores in the virtual machine.

14 Claims, 4 Drawing Sheets

(58) Field of Classification Search
CPC . H04L 63/102; H04L 63/1458; H04L 67/125; H04L 67/303; H04L 12/4641; H04L 41/046; H04L 43/04; H04L 43/0882; H04L 43/0888; H04L 63/1441; H04L 67/2804; H04L 2463/121; H04L 69/22; H04L 9/3297; G06F 9/45558; G06F 9/45533; G06F 2201/815; G06F 2212/152; G06F 9/455; G06F 11/3664; G06F 11/3672; G06F 11/263; G06F 11/3684; G06F 2221/034; G06F 9/45504; G06F 2221/033; G06F 21/53; G06F 17/30353; G06F 17/30575; G06F 17/30578; G06F 9/466; G06F 9/52; H04W 24/06
USPC .............. 709/223, 224, 218, 205, 220, 227; 370/252, 389, 253; 703/23, 135, 134; 718/1; 717/124, 135, 134
See application file for complete search history.

(56) References Cited

U.S. PATENT DOCUMENTS

| | | | |
|---|---|---|---|
| 6,769,054 | B1 | 7/2004 | Sahin et al. |
| 6,792,393 | B1 | 9/2004 | Farel et al. |
| 7,159,184 | B2 | 1/2007 | Ullah et al. |
| 7,277,395 | B2 | 10/2007 | Rosen et al. |
| 7,328,134 | B1 | 2/2008 | Burbidge, III et al. |
| 7,603,372 | B1 | 10/2009 | Honicky, Jr. et al. |
| 7,730,492 | B1 | 6/2010 | Blaukopf et al. |
| 7,814,495 | B1 | 10/2010 | Lim et al. |
| 7,865,908 | B2 | 1/2011 | Garg et al. |
| 7,890,951 | B2 | 2/2011 | Vinberg et al. |
| 7,945,657 | B1* | 5/2011 | McDougall ......... G06F 11/3457 703/21 |
| 8,068,602 | B1 | 11/2011 | Bluman et al. |
| 8,145,470 | B2 | 3/2012 | Green |
| 8,286,147 | B2 | 10/2012 | Alpern et al. |
| 8,694,644 | B2 | 4/2014 | Chen et al. |
| 8,805,951 | B1 | 8/2014 | Faibish et al. |
| 8,984,341 | B1 | 3/2015 | Chandrasekharapuram et al. |
| 9,436,566 | B2 | 9/2016 | Panda et al. |
| 9,507,616 | B1 | 11/2016 | Ramanath et al. |
| 9,524,299 | B2 | 12/2016 | Lahiri et al. |
| 9,529,684 | B2 | 12/2016 | Sincan et al. |
| 9,785,527 | B2 | 10/2017 | Regev et al. |
| 2002/0087282 | A1 | 7/2002 | Millard |
| 2002/0184614 | A1 | 12/2002 | Davia et al. |
| 2003/0036897 | A1 | 2/2003 | Flores et al. |
| 2003/0154432 | A1 | 8/2003 | Scott et al. |
| 2003/0182408 | A1 | 9/2003 | Hu |
| 2004/0010787 | A1 | 1/2004 | Traut et al. |
| 2004/0015600 | A1 | 1/2004 | Tiwary et al. |
| 2004/0021678 | A1 | 2/2004 | Ullah et al. |
| 2004/0139437 | A1 | 7/2004 | Arndt |
| 2005/0039180 | A1 | 2/2005 | Fultheim et al. |
| 2005/0116920 | A1 | 6/2005 | Park et al. |
| 2005/0216234 | A1 | 9/2005 | Glas et al. |
| 2005/0268298 | A1 | 12/2005 | Hunt et al. |
| 2006/0025985 | A1 | 2/2006 | Vinberg et al. |
| 2006/0037002 | A1 | 2/2006 | Vinberg et al. |
| 2006/0123416 | A1 | 6/2006 | Cibrario Bertolotti et al. |
| 2006/0224375 | A1* | 10/2006 | Barnett ............... G06F 11/3447 703/22 |
| 2007/0069005 | A1 | 3/2007 | Dickerson et al. |
| 2007/0112549 | A1 | 5/2007 | Lau et al. |
| 2007/0213966 | A1* | 9/2007 | Noble .................... G06F 17/50 703/13 |
| 2007/0233453 | A1* | 10/2007 | Ito ....................... G06F 11/3664 703/26 |
| 2007/0283347 | A1 | 12/2007 | Bobroff et al. |
| 2008/0059952 | A1* | 3/2008 | Van Huben ......... G06F 11/2094 717/120 |
| 2008/0163207 | A1 | 7/2008 | Reumann et al. |
| 2008/0189700 | A1 | 8/2008 | Schmidt et al. |
| 2008/0208554 | A1 | 8/2008 | Igarashi |
| 2008/0221857 | A1 | 9/2008 | Casotto |
| 2008/0244525 | A1* | 10/2008 | Khalil ................. G06F 11/3688 717/124 |
| 2009/0089038 | A1 | 4/2009 | Nadgir et al. |
| 2009/0089781 | A1 | 4/2009 | Shingai et al. |
| 2009/0119542 | A1 | 5/2009 | Nagashima et al. |
| 2009/0300613 | A1 | 12/2009 | Doi |
| 2009/0307530 | A1* | 12/2009 | Tarta .................... G06F 11/3668 714/38.14 |
| 2009/0327784 | A1* | 12/2009 | Shah .................... G06F 11/3006 713/340 |
| 2010/0111494 | A1 | 5/2010 | Mazzaferri |
| 2010/0153529 | A1 | 6/2010 | Moser |
| 2010/0161864 | A1 | 6/2010 | Barde et al. |
| 2010/0169882 | A1 | 7/2010 | Ben-Yehuda et al. |
| 2010/0235831 | A1 | 9/2010 | Dittmer |
| 2010/0241734 | A1 | 9/2010 | Miyajima |
| 2010/0250824 | A1 | 9/2010 | Belay |
| 2010/0299666 | A1 | 11/2010 | Agbaria et al. |
| 2010/0325191 | A1 | 12/2010 | Jung et al. |
| 2010/0332212 | A1 | 12/2010 | Finkelman |
| 2011/0010515 | A1 | 1/2011 | Ranade |
| 2011/0010691 | A1 | 1/2011 | Lu et al. |
| 2011/0066786 | A1 | 3/2011 | Colbert |
| 2011/0066819 | A1 | 3/2011 | Mashtizadeh et al. |
| 2011/0126193 | A1 | 5/2011 | Mullin et al. |
| 2011/0176441 | A1 | 7/2011 | Matsuoka |
| 2011/0197190 | A1 | 8/2011 | Hattori et al. |
| 2011/0202917 | A1 | 8/2011 | Laor |
| 2011/0239214 | A1* | 9/2011 | Frields ................. G06F 9/45533 718/1 |
| 2011/0246171 | A1 | 10/2011 | Cleeton et al. |
| 2011/0307739 | A1* | 12/2011 | El Mahdy ............. G06F 11/261 714/28 |
| 2012/0054409 | A1 | 3/2012 | Block et al. |
| 2012/0054740 | A1 | 3/2012 | Chakraborty et al. |
| 2012/0060167 | A1 | 3/2012 | Salsburg et al. |
| 2012/0084487 | A1 | 4/2012 | Barde |
| 2012/0102492 | A1 | 4/2012 | Iwata |
| 2012/0110181 | A1 | 5/2012 | Tsirkin |
| 2012/0131576 | A1 | 5/2012 | Hatta et al. |
| 2012/0159473 | A1 | 6/2012 | Tsirkin |
| 2012/0192182 | A1 | 7/2012 | Hayward et al. |
| 2012/0246644 | A1 | 9/2012 | Hattori et al. |
| 2012/0284709 | A1 | 11/2012 | Lorenc et al. |
| 2012/0290766 | A1 | 11/2012 | Oshins |
| 2012/0311387 | A1 | 12/2012 | Santhosh et al. |
| 2012/0317555 | A1* | 12/2012 | Aluru .................. G06F 11/3664 717/134 |
| 2013/0019242 | A1 | 1/2013 | Chen et al. |
| 2013/0036416 | A1 | 2/2013 | Raju et al. |
| 2013/0055026 | A1 | 2/2013 | Hatano et al. |
| 2013/0080999 | A1 | 3/2013 | Yang |
| 2013/0139154 | A1 | 5/2013 | Shah |
| 2013/0139155 | A1 | 5/2013 | Shah |
| 2013/0139173 | A1 | 5/2013 | Carter |
| 2013/0152083 | A1 | 6/2013 | Miki et al. |
| 2013/0159650 | A1 | 6/2013 | Wakamiya |
| 2013/0179879 | A1 | 7/2013 | Zhang et al. |
| 2013/0227551 | A1 | 8/2013 | Tsirkin |
| 2013/0238802 | A1 | 9/2013 | Sarikaya |
| 2013/0247056 | A1 | 9/2013 | Hattori et al. |
| 2013/0263118 | A1 | 10/2013 | Kannan et al. |
| 2013/0275592 | A1 | 10/2013 | Xu et al. |
| 2013/0282354 | A1 | 10/2013 | Sayers et al. |
| 2013/0283265 | A1 | 10/2013 | Acharya et al. |
| 2013/0297769 | A1 | 11/2013 | Chang et al. |
| 2013/0318528 | A1 | 11/2013 | Hirose |
| 2013/0325433 | A1 | 12/2013 | Albano et al. |
| 2013/0326175 | A1 | 12/2013 | Tsirkin |
| 2013/0339956 | A1 | 12/2013 | Murase et al. |
| 2013/0346987 | A1 | 12/2013 | Raney et al. |
| 2014/0006358 | A1 | 1/2014 | Wang et al. |
| 2014/0013306 | A1 | 1/2014 | Gounares et al. |
| 2014/0047272 | A1 | 2/2014 | Breternitz et al. |
| 2014/0068335 | A1 | 3/2014 | Bromley et al. |

(56) References Cited

U.S. PATENT DOCUMENTS

| | | | |
|---|---|---|---|
| 2014/0081615 | A1 | 3/2014 | Abdirashid et al. |
| 2014/0108001 | A1 | 4/2014 | Brown et al. |
| 2014/0109051 | A1 | 4/2014 | McDonald et al. |
| 2014/0223431 | A1 | 8/2014 | Yoshimura et al. |
| 2014/0282425 | A1* | 9/2014 | Zhao .................. G06F 11/3688 717/127 |
| 2014/0289418 | A1 | 9/2014 | Cohen et al. |
| 2014/0298335 | A1 | 10/2014 | Regev et al. |
| 2014/0317625 | A1 | 10/2014 | Ichikawa et al. |
| 2015/0007174 | A1 | 1/2015 | Jain |
| 2015/0046141 | A1 | 2/2015 | Lahiri et al. |
| 2015/0100958 | A1 | 4/2015 | Banavalikar et al. |
| 2015/0135178 | A1 | 5/2015 | Fischer et al. |
| 2015/0140956 | A1 | 5/2015 | Prewitt, II et al. |
| 2016/0006844 | A1* | 1/2016 | Tychina .............. H04L 12/6418 370/474 |
| 2016/0034289 | A1 | 2/2016 | Amano et al. |
| 2016/0034372 | A1 | 2/2016 | Panda et al. |
| 2017/0024308 | A1* | 1/2017 | Knoulich .................. G06F 8/60 |

OTHER PUBLICATIONS

Applicant-Initiated Interview Summary for U.S. Appl. No. 13/969,085 (dated Jun. 7, 2016).
Communication of European publication number and information on the application of Article 67(3) EPC for European Application No. 14836839.2 (dated May 25, 2016).
Applicant-Initiated Interview Summary for U.S. Appl. No. 14/224,024 (dated May 13, 2016).
Notice of Allowance and Fee(s) Due for U.S. Appl. No. 14/445,921 (dated May 12, 2016).
Final Office Action for U.S. Appl. No. 13/969,085 (dated Apr. 19, 2016).
Applicant-Initiated Interview Summary for U.S. Appl. No. 14/445,921 (dated Apr. 14, 2016).
Non-Final Office Action for U.S. Appl. No. 14/224,024 (dated Feb. 3, 2016).
Non-Final Office Action for U.S. Appl. No. 14/445,921 (dated Jan. 14, 2016).
Non-Final Office Action for U.S. Appl. No. 13/969,085 (dated Sep. 24, 2015).
Commonly-assigned, co-pending U.S. Appl. No. 14/749,606 for "Methods, Systems, and Computer Readable Media for Emulating Computer Processing Usage Patterns on a Virtual Machine," (Unpublished, filed Jun. 24, 2015).
"IxVM: Validating Virtualized Assets and Environments," Ixia, Data Sheet, pp. 1-8 (Jun. 2015).

Notification of Transmittal of the International Search Report and the Written Opinion of the International Searching Authority, or the Declaration for PCT International Application No. PCT/US2014/045658 (dated Oct. 30, 2014).
Notification of Transmittal of the International Search Report and the Written Opinion of the International Searching Authority, or the Declaration for PCT International Application Application No. PCT/US2014/031637 (dated Jul. 31, 2014).
Commonly-assigned, co-pending U.S. Appl. No. 14/445,921 for "Methods, Systems, and Computer Readable Media for Scaling a Workload," (Unpublished, filed Jul. 29, 2014).
"IxLoad: Specifications," https://web.archive.org/web/20130901094417/http://www.ixiacom.com/products/network_test/applications/ixloads/specifications/index.php, pp. 1-5 (Sep. 1, 2013).
"IxLoad" Ixia, Solution Brief, pp. 1-4 (Feb. 2012).
Communication pursuant to Article 94(3) EPC for European Patent Application Serial No. 14 774 774.5 (dated Nov. 6, 2018).
Notification of Transmittal of the International Search Report and the Written Opinion of the International Searching Authority, or the Declaration for International Application No. PCT/US2017/023625 (dated Jun. 13, 2017).
Notice of Allowance and Examiner Initiated Interview Summary for U.S. Appl. No. 14/224,024 (dated Jun. 6, 2017).
Martigoni et al., "Testing System Virtual Machines," ISSTA'10, pp. 1-11 (2010).
Liu et al., "Live Migration of Virtual Machine Based on Full System Trace and Replay," Services Computing Technology and System Lab, Huazhong University of Science and Technology, pp. 101-110 (2009).
Communication of the extended European search report for European Patent Application No. 14774774.5 (dated Nov. 23, 2016).
Advisory Action for U.S. Appl. No. 14/224,024 (dated Sep. 27, 2016).
Notice of Allowance and Fee(s) Due for U.S. Appl. No. 14/251,547 (dated Aug. 23, 2016).
Notice of Allowance and Fee(s) Due for U.S. Appl. No. 13/969,085 (dated Aug. 10, 2016).
Notice of Allowance and Fee(s) Due for U.S. Appl. No. 14/749,606 (dated Jul. 27, 2016).
Applicant-Initiated Interview Summary for U.S. Appl. No. 14/224,024 (dated Jul. 18, 2016).
Communication of the extended European search report for European Application No. 14836839.2 (dated Feb. 10, 2017).
Non-Final Office Action for U.S. Appl. No. 14/224,024 (dated Jan. 10, 2017).
Communication of European publication number and information on the application of Article 67(3) EPC for European Application No. 14774774.5 (dated Jan. 7, 2016).
Decision to grant a European patent pursuant to Article 97(1) EPC for European Patent Application Serial No. 14836839.2 (dated Jul. 26, 2018).

* cited by examiner

402 — GENERATING A USER SPECIFICATION

404 — RECEIVING, BY A VIRTUAL MACHINE HOSTED BY A DEVICE UNDER TEST, THE USER SPECIFICATION INCLUDING A PLURALITY OF NETWORK TRAFFIC PATTERNS AND COMPUTER PROCESSING USAGE PATTERNS

406 — GENERATING A PLURALITY OF NETWORK TRAFFIC SEQUENCES AND A PLURALITY OF COMPUTER PROCESSING USAGE PATTERN INSTRUCTION SEQUENCES

408 — DISTRIBUTING THE NETWORK TRAFFIC SEQUENCES AMONG A PLURALITY OF VIRTUAL NETWORK INTERFACE CARDS AND DISTRIBUTING THE COMPUTER PROCESSING USAGE PATTERN INSTRUCTION SEQUENCES AMONG A PLURALITY OF VIRTUAL PROCESSING CORES

410 — SYNCHRONIZING THE EXECUTION OF THE NETWORK TRAFFIC SEQUENCES WITH THE EXECUTION OF THE COMPUTER PROCESSING USAGE PATTERN INSTRUCTION SEQUENCES IN THE VIRTUAL MACHINE

FIG. 4

METHODS, SYSTEMS, AND COMPUTER READABLE MEDIA FOR EMULATING NETWORK TRAFFIC PATTERNS ON A VIRTUAL MACHINE

TECHNICAL FIELD

The subject matter described herein relates to methods and devices used for testing virtual deployments. More particularly, the subject matter described herein relates to methods, systems, and computer readable media for emulating network traffic patterns on a virtual machine.

BACKGROUND

At present, numerous network elements and service nodes are being deployed in continuously expanding telecommunications networks by system administrators. In order to properly address the processing needs of a network by provisioning the optimal number or amount of resources, a system administrator typically requires knowledge of the processing capabilities of a network element in light of the likely demands it will be subjected to by network users. To obtain this pertinent information, a system administrator would ideally be able to simulate specific CPU and IO usage patterns on a virtual machine hosted by a network element in a testing environment. Notably, such specific simulations enable test managers to stress test a virtual machine setup in a device under test (DUT) and subsequently monitor and measure the resulting performance behavior.

Accordingly, there exists a need for methods, systems, and computer readable media for emulating computer processing usage patterns on a virtual machine.

SUMMARY

Methods, systems, and computer readable media for emulating network traffic patterns on a virtual machine are disclosed. According to one embodiment, the subject matter described herein includes a method for emulating network traffic patterns on a virtual machine. In one example, the method includes generating a user specification based on a plurality of network traffic patterns and computer processing usage patterns and receiving, at a virtual machine hosted by a device under test (DUT), the user specification containing the plurality of network traffic patterns and computer processing usage patterns. The method further includes generating a plurality of network traffic sequences based on the plurality of network traffic patterns and a plurality of computer processing usage pattern instruction sequences based on the plurality of computer processing usage patterns. The method also includes distributing each of the plurality of network traffic sequences among a plurality of virtual network interface cards (VNICs) and distributing each of the plurality of computer processing usage pattern instruction sequences among a plurality of virtual processing cores in the virtual machine.

The subject matter described herein may be implemented in hardware, software, firmware, or any combination thereof. As such, the terms "function" or "module" as used herein refer to hardware, which may also include software and/or firmware components, for implementing the feature being described (e.g., conducting simulations and emulations via executed software). In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for emulating network traffic patterns on a virtual machine. In some embodiments, the network traffic patterns may also be synchronized with the execution of simulated computer processing unit (CPU) usage patterns. Namely the disclosed subject matter facilitates the simulation of network traffic patterns that replicate network traffic (e.g., packet traffic and signaling) associated with user-defined application actions or activities defined via a usage pattern or profile contained in a user specification. As used herein, a usage pattern or profile may include a number of processing activities or loads associated with operation of an application or a combination of applications. Further, the usage pattern can represent the activity generated by a single emulated user or multiple emulated users (e.g., multiple and contemporaneous instances of bank account access). Similarly, as used herein, a network traffic pattern or profile may include simulated network traffic behavior that is associated with CPU executed activities that simulate the aforementioned user actions/activities (e.g., simulated user actions) corresponding to the use of applications.

In some embodiments, the subject matter simulates the computer processing (e.g., CPU) usage by performing the actions specified in both user-defined usage patterns and user-defined network traffic patterns, such as by pre-canned/custom simulation usage patterns or by pre-canned/custom network traffic patterns. Notably, the disclosed subject matter affords a user the ability to define a specific pattern of computer processing usage that can be used and provisioned in a test tool environment to generate CPU consumption, file input/output (I/O) access (e.g., non-cache storage access, disk access, etc.), memory usage (e.g., RAM consumption, cache utilization, processor cache consumption, and the like)

and/or related network traffic activity. The predefined levels of generated computer processing usage (e.g., CPU consumption, file I/O access, and/or memory usage) experienced by user actions and/or network traffic activity may therefore be used to validate the CPU management solution being employed by a physical device and/or virtual machine being tested. In some embodiments, the subject matter is further configured to synchronize the execution of network traffic patterns (and/or underlying sequences) with the execution of the computer processing usage patterns (e.g., CPU usage patterns) and/or underlying sequences within a virtual machine. For example, the virtual machine may utilize application programming interfaces (APIs) to conduct the exchange of synchronization messages between a pattern sequence generator and a network traffic sequence generator to facilitate a test simulation of a device under test as described below.

Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
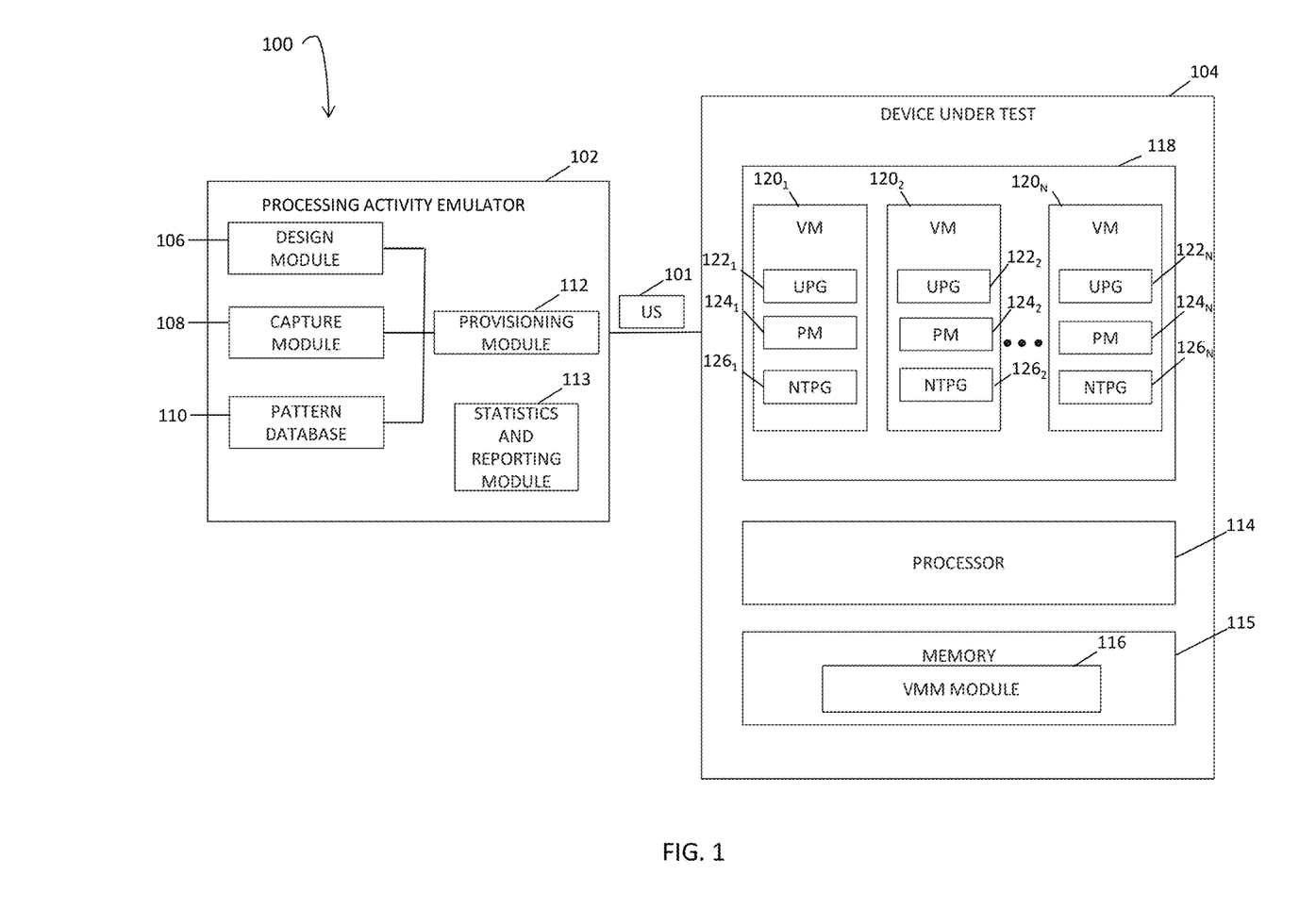
FIG. 1 is a diagram illustrating an exemplary system for emulating network traffic patterns on a virtual machine according to an embodiment of the subject matter described herein.

FIG. 1 is a diagram illustrating a test system 100 that includes a processing activity emulator 102 (e.g., a processing activity emulation machine) and a device under test (DUT) 104. Processing activity emulator 102 can be communicatively connected to DUT 104 via a wired or wireless connection. In some embodiments, processing activity emulator 102 may include a design module 106, a capture module 108, a pattern database 110, a provisioning module 112, and a statistics and reporting module 113. In some embodiments, each of modules 106, 108, 112, and 113 may comprise a software based program that is contained/stored in memory where it can be executed by a processor (not shown) in emulator 102. Pattern database 110 can comprise any storage unit or memory structure configured to store usage pattern data and network traffic pattern data.

In some embodiments, design module 106 can be utilized by a user (e.g., a system administrator, network manager, test administrator, etc.) to create and/or construct network traffic patterns and CPU usage patterns that may be included in a user specification. In some embodiments, design module 106 enables a user to specify certain parameters and/or values that are to be included in the customized user specification. For example, design module 106 may comprise a module configured to receive input and/or specifications from a user via a user interface. In some embodiments, the design module 106 enables a user to specify a profile comprising a sequence of user activity that emulate a combination of CPU usage actions and network traffic actions. For example, a profile may include activities representative of a network game player that starts playing an online game which requires allocation of resources and execution of certain CPU specific actions. Such CPU actions may result from the occurrence of network traffic actions including authentication, communicating game content data from a host to the player user, and receiving updated game content data from the player user. Another example of a profile may represent a Twitch application user that utilizes the application to rank players and view living gaming video streams. Yet another example of a profile may be representative of a user who opens a new Word document stored in the cloud and subsequently edits and saves the document. Notably, these simulated user actions may involve a combination of network traffic patterns and CPU usage patterns. Further, the user may issue a CPU intensive operation to convert a document to PDF format and then download the document via a network traffic action.

In some embodiments, a custom (e.g., pre-canned) activity pattern may include both network traffic activities and associated CPU usage activities resulting from the execution of the network traffic activities. In some embodiments, each of the network traffic activities and CPU usage activities may, upon creation, be tagged by design module 106 with an activity pairing identifier and a related timeline data value or tag. Notably, the activity identifiers and timeline data values may be ultimately utilized by components in a virtual machine (e.g., pattern execution module and/or network traffic sequence generator) to synchronize a network traffic activity with its associated CPU usage activity (as embodied as instruction sequence) in order to facilitate a test simulation.

Figure 2:
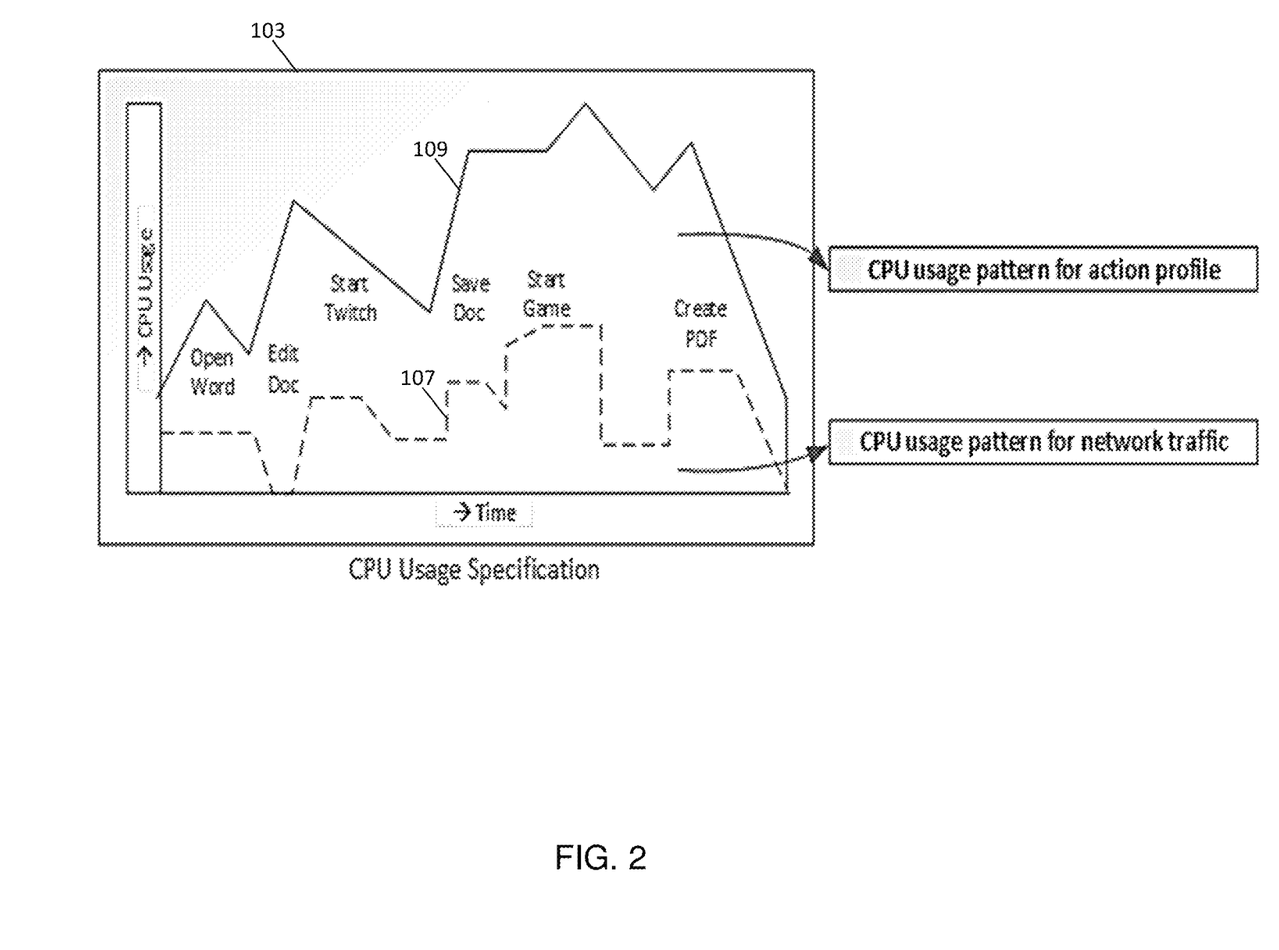
FIG. 2 is a line graph representing a user specification according to an embodiment of the subject matter described herein.

In some embodiments, design module 106 may be utilized by a user to create and/or construct computer processing usage patterns that emulate a user-defined pattern of user interaction associated with the execution of a software application (e.g., user activity corresponding to the operation of word processing application). Specifically, design module 106 may be used to customize a user specification 101 that comprises i) a computer processing usage pattern specification that specifies the individual activities, inputs, and/or commands a software application may experience under the operation of a user and ii) a network traffic pattern specification that comprises network actions related to at least some of the activities specified in the usage pattern specification. In some embodiments, a user may initially select the executable actions of the application operation that need to be emulated on a device (e.g., a DUT) and/or associated virtual machines to be tested. Exemplary user actions that may be simulated may include the launching/opening the application, the closing of the application, the operation of the application, saving files within the application, and the like). Examples of applications in this context may include a word processing application, a media player application, a spreadsheet application, web browsing application, and the like. In some embodiments, user-defined activities and actions may be represented in a graphical manner (as opposed to a task-based manner) as shown in FIG. 2. For instance, the user-defined activities may include a timeline that defines and/or specifies different usage patterns of activity, such as a ramp-up of processing activity, a ramp-down of processing activity, a Poisson distribution pattern of processing activity, and the like.

As an example, a graphical representation of an exemplary user specification is illustrated in FIG. 2. Notably, user specification 103 (which is not unlike user specification 101 in FIG. 1) includes a solid line 109 that depicts the CPU usage pattern for a particular action profile representing actions performed by a user. Similarly, FIG. 2 further includes a dashed line 107 that depicts the usage pattern associated with communicated network traffic. Notably, the CPU usage levels represented by solid line 109 includes and accounts for the CPU usage associated with the network traffic as indicated by dashed line 107. Specifically, solid line 109 of user specification 103 represents the cumulative CPU usage attributed by both user actions (e.g., open word processing application, edit a word processing document, start Twitch application, start a game, create a PDF document, etc.) and network traffic levels associated with said user actions. Notably, processing activity emulator 102 may utilize user specification 103 (among other generated user profiles) as input to generate user specification 101.

In addition to specifying the actions to be emulated, the user may subsequently select associated execution parameters (e.g., number of cores to run the application, etc.) that will be applied to the specified actions of the user-defined computer processing usage pattern. In some instances, the execution parameters operate to establish and/or provide the rules for the execution of the selected actions on the DUT. For example, a user may utilize design module 106 (e.g., via a GUI or command line interface) to specify a number of execution parameters, such as i) a computer processing usage pattern count, ii) an amount of total time for executing the patterns, iii) a designation as to whether the patterns are to be executed serially or in parallel, iv) a designation as to whether the patterns should load processing cores in an evenly distributed manner, and the like. In addition to these 'global' input execution parameters, each of the patterns may further include pattern-specific execution parameters, including i) a specified thread count for executing the computer processing usage pattern, ii) the number of cores to use to execute the computer processing usage pattern, iii) an indication (e.g., a flag, a bit indicator, etc.) whether to automatically scale the computer processing usage pattern to run on all of the virtual processing cores, iv) a number of instances (e.g., "P" times) to repeat the execution of the computer processing usage pattern, and/or v) the total time (e.g., a timeline and/or a time limit duration) to execute the computer processing usage pattern. In some embodiments, the execution parameters may further include a central processing unit (CPU) usage threshold limit, a file I/O access threshold limit, and/or a memory usage threshold limit to be adhered to in the simulation testing. Notably, each of these threshold limits may include a minimum threshold limit and/or a maximum threshold limit. In a similar fashion, a user may utilize design module 106 to design network traffic pattern include a number of network traffic sequence parameters, such as i) network command sequence indicator, ii) an execution time, iii) a number of instances (e.g., "P" times) to repeat the execution of the network traffic pattern, and iv) a target objective (e.g., simulated users, number of connections, number transactions, etc.).

After the usage and network traffic actions/activities and associated parameters are designated by the user as described above, design module 106 may generate a user specification 101 that comprises a network traffic pattern specification data and usage pattern specification data, such as a CPU usage pattern specification, a file I/O access pattern specification, a memory usage pattern specification. Notably, design module 106 may combine or aggregate the designated actions and parameters to form a user specification 101, which may be embodied as a software based package or object comprising XML data, binary data, or file data.

After being created by design module 106, user specification 101 (which comprises a usage pattern specification data, a network traffic pattern specification data, or a combination thereof) may be forwarded to provisioning module 112 by design module 106 for delivery to DUT 104. Alternatively, user specification 101 may be stored in pattern database 110 by design module 106 via provisioning module 112 for future test use and/or DUT provisioning. In some embodiments, provisioning module 112 is configured to send the user specification 101 to a particular virtual machine 120 that has been designated to perform the simulation. Notably, the user specification 101 is provided to both a usage pattern generator (UPG) 122 and a network traffic pattern generator (NTPG) 126 in the designated virtual machine 120. Each of UPG 122 and NTPG 126 is configured to extract the relevant pattern data and synchronization data in order to facilitate i) the execution of a CPU usage simulation and/or a network traffic simulation and ii) the synchronization of the execution of these two simulations conducted by the generators. More specifically, UPG 122 is configured to extract and/or utilize CPU usage pattern specification data from user specification 101 and NTPG 126 is configured to extract and/or utilize the network traffic pattern specification data from user specification 101. The manner in which a virtual machine receives and processes user specification 101 is described in further detail below and in FIG. 3.

As indicated above, processing activity emulator 102 further includes capture module 108. In some examples, capture module 108 can include any software entity that is configured to monitor and record actual CPU usage patterns being executed by a deployed computing device and/or network element. Further, capture module 108 may be configured to capture network traffic activity that can be used to create and generate a network traffic pattern and/or profile. For example, capture module 108 may comprise a utility software element that is executed by at least one processor of emulator 102 and that provides diagnostic tools for monitoring interactions (such as system calls, signal deliveries, changes in process state, etc.) between the simulated application processes and the processor. In other embodiments, capture module 108 includes a diagnostic software tool that monitors and records system calls associated with both CPU usage and network traffic activity. After capture module 108 records a plurality of the observed system calls and/or signal deliveries, capture module 108 may forward the recorded information to design module 106 (e.g., via an application programming interface (API)). Design module 106 can then process the information received from capture module 108 to generate one or more network traffic pattern specifications and usage pattern specifications. In some examples, capture module 108 can be configured to monitor and record actual network traffic patterns that are handled by a deployed computing device and/or network element. Such network traffic patterns may subsequently be utilized and/or modeled by design module 106 to generate a network traffic profile.

In some embodiments, pattern database 110 may comprise any data storage device configured to store a plurality of customized usage pattern specification data and/or network traffic pattern specification data. The pattern specification data stored in database 110 may include a customized pattern specification generated by design module 106 or a pattern specification based on data captured by capture module 108. Moreover, pattern database 110 may also be configured to receive and store pre-canned CPU usage patterns and network traffic patterns generated and/or designed by a separate system. In some embodiments, provisioning module 112 may be configured to access database 110 per a user's direction or via a system call in order to obtain a stored pattern specification for delivery to and provisioning on DUT 104 (e.g., as part of user specification 101).

As shown in FIG. 1, processing activity emulator 102 may further include a statistics and reporting module 113. In some embodiments, statistics and reporting module 113 is configured to generate reports the statistics and test status to the users of the system (e.g., via messages and/or a graphical user interface (GUI) display).

In some embodiments, DUT 104 can comprise a processor 114 and memory 115. Memory 115 may include a virtual machine monitoring (VMM) module 116 that, when executed by processor 114, establishes a virtual environment 118 on DUT 104. In some embodiments, VMM module 116 may comprise a hypervisor or other software application that is configured to manage and support a virtual environment 118 that includes a plurality of virtual machines $120_{1...N}$ (or virtual ports). Within each virtual machine or port, there is an ability to specify the pattern as an input. As described below, each virtual machine has a usage pattern generator 122 and a network traffic pattern generator 126 that recognizes the input and generates the pattern. For example, each of virtual machines $120_{1...N}$ depicted in FIG. 1 may include a usage pattern generator 122, a network traffic pattern generator 126, and a publisher module (PM) 124. Virtual environment 118 may be further supported by the underlying hardware components (e.g., processor 114, memory 115, and data storage elements) residing on DUT 104.

As depicted in FIG. 1, DUT 104 comprises processor 114 and memory 115, which may be communicatively connected via a system bus (not shown). In some embodiments, processor 114 can comprise a microprocessor, central processing unit (CPU), or any other like hardware based processing unit. In some embodiments, a usage pattern generator 122 and a network traffic pattern generator 126 can be electronically stored in memory 115, which can comprise random access memory (RAM), read only memory (ROM), optical read/write memory, cache memory, magnetic read/write memory, flash memory, or any other non-transitory computer readable medium. In some embodiments, processor 114 and memory 115 can be used to execute and manage the operation of UPG 122, NTPG 126, and/or PM 124. In some embodiments, each of processor 114 and memory 115 may comprise hardware elements of an underlying special purpose machine that supports the execution of UPG 122, PM 124, and/or NTPG 126 in a virtual machine and/or virtual environment.

In some embodiments, usage pattern generator 122 includes a software module that can be configured to receive a user specification 101 as input from emulator 102 and extract relevant computer processing usage pattern specification data (e.g., CPU usage pattern specification data). In a similar manner, network traffic pattern generator 126 includes a software module that can be configured to receive a user specification 101 as input from emulator 102 and extract relevant network traffic pattern specification data. The functionality of usage pattern generator 122 and network traffic pattern generator 126 is discussed in greater detail below with regard to FIG. 2 (e.g., usage pattern generator 205 and network traffic pattern generator 215).

Figure 3:
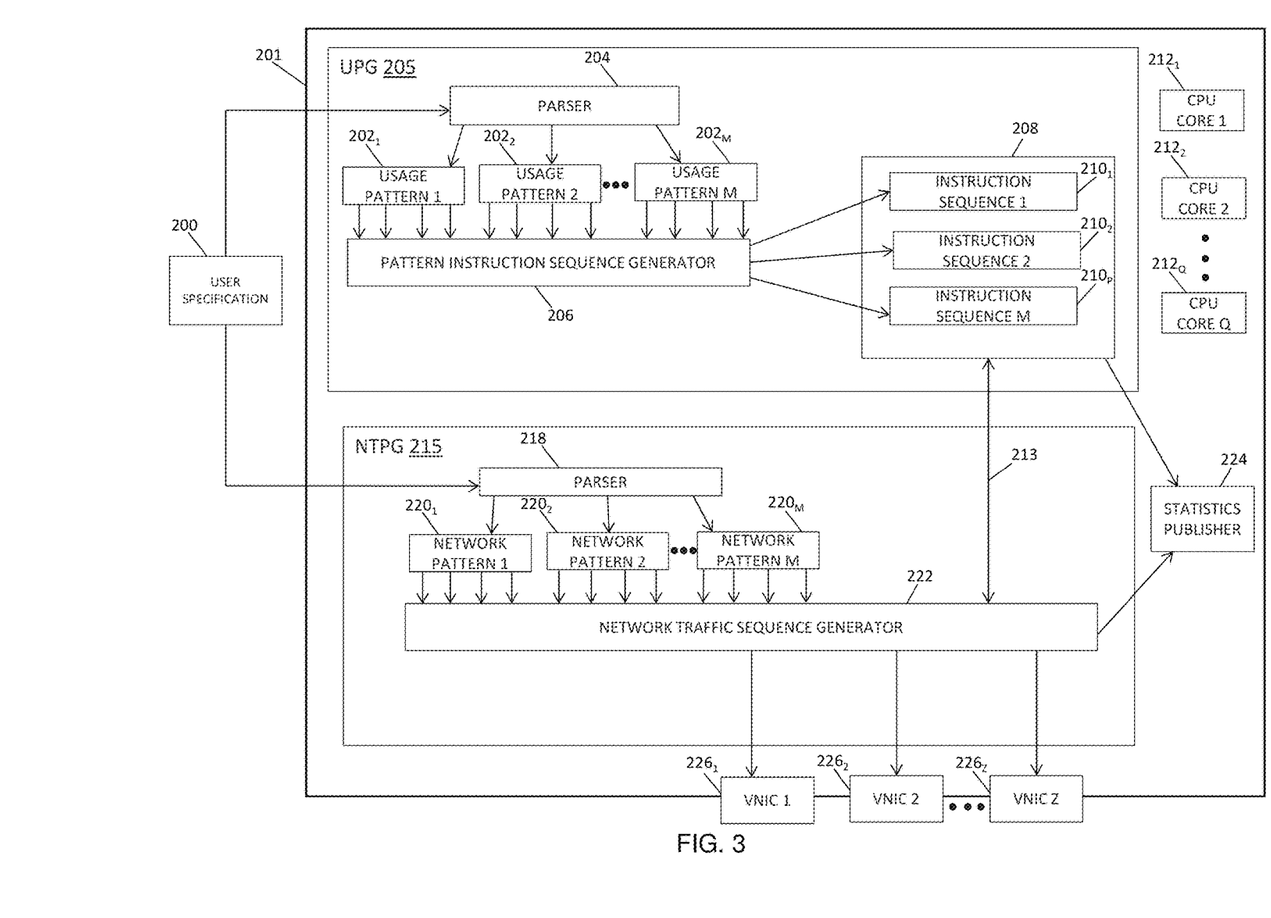
FIG. 3 is a block diagram illustrating an exemplary virtual machine configured for emulating network traffic patterns according to an embodiment of the subject matter described herein.

In some embodiments, publishing module 124 may include a software module that is configured to monitor CPU usage across multiple processing cores (e.g., cores 212 in FIG. 3) and network traffic activity across multiple VNICs (e.g., VNICs 226 in FIG. 3). Publishing module 124 further reports the execution status information to a test manager via processing activity emulator 102. In some embodiments, emulator 102 may be configured to aggregate execution status information received from multiple virtual machines (e.g., virtual machines $120_{1...N}$) and display the processing statistics to a test manager or other user. Notably, the publishing of the pattern and associated processing statistics is used to confirm that the performance level the virtual machine is exhibiting from the hypervisor is accurate.

FIG. 3 is a block diagram illustrating an exemplary virtual machine configured for emulating and/or synchronizing the distribution and/or execution of computer processing usage patterns and network traffic patterns according to an embodiment of the subject matter described herein. For example, virtual machine 201 may comprise a usage pattern generator (UPG) 205, a network traffic pattern generator (NTPG) 215, a plurality of virtual network interface cards (VNICs) 226, and a plurality of virtual processing cores, such as virtual CPU cores 212. UPG 205 may further include a parser 204, a pattern instruction sequence generator 206, and a pattern execution module 208, each of which are described in greater detail below. Likewise, NTPG 215 includes a parser 218 and a network traffic sequence generator 222, which are similarly described in greater detail below.

In some embodiments, parser 204 in UPG 205 receives a user specification 200 from a processing activity emulator (e.g., emulator 102 in FIG. 1) for processing. For example, parser 204 may be configured to extract one or more computer processing usage patterns (e.g., CPU usage patterns) from the received user specification 200 (not unlike user specification 101 in FIG. 1). Moreover, parser 204 may further extract usage pattern parameters from each of the patterns and convert each of the execution parameters into a machine compatible format. For example, parser 204 may convert the execution parameters into an XML file that may be read by pattern instruction sequence generator 206.

In some embodiments, each of usage patterns 202 may include pattern parameter data specifying i) a thread count, ii) a processing core count, iii) scalability to all cores, iv) a number of times to repeat, and v) an execution time is obtained from each of the patterns to be processed (e.g., patterns $202_{1...M}$). After the translation by parser 204, the aforementioned pattern parameters can be forwarded to pattern instruction sequence generator 206 where the parameters are collected and aggregated. In some embodiments, pattern instruction sequence generator 206 receives individual CPU usage pattern information. In some embodiments, pattern instruction sequence generator 206 may be configured to further receive global CPU usage pattern information as input from parser 204. Notably, global CPU usage pattern information includes an aggregation of the individual CPU usage pattern information provided by parser 204.

In some embodiments, parser 218 in NTPG 215 receives a user specification 200 for processing. For example, parser 218 may be configured to extract one or more network traffic patterns from the received user specification 200 (not unlike user specification 101 in FIG. 1). Moreover, parser 218 may further extract network traffic parameters from each of the patterns 220 and convert each of the parameters in patterns 220 into a machine compatible format. For example, parser 204 may convert the parameters into an XML file that is readable by network traffic sequence generator 222. In some embodiments, each of network traffic patterns 220 may include pattern parameter data specifying i) a network command sequence, ii) the time allotted to execute a complete set of network commands, iii) an indication of whether the sequence of commands needs to be repeated "P" number of times, and/or iv) a target objective for the network traffic activity (e.g., simulation of a particular number of users, a number of concurrent connections, a particular rate of connections per second, and/or a particular rate of transaction per second, and/or throughput).

Returning to UPG 205, upon receiving the execution parameters included in usage patterns 202, pattern instruction sequence generator 206 may generate a unique instruction sequence for each of the plurality of usage patterns. As used herein, an exemplary instruction sequence may include a software program and/or object. For example, the instruction sequence may be embodied in an XML format, a binary format, JavaScript Object Notation (JSON) format, or as file data. Once generated by pattern instruction sequence generator 206, the instruction sequences are forwarded to pattern execution module 208 as input. For example, FIG. 3 depicts instruction sequences $210_{1 \ldots P}$ being utilized (e.g., accessed from memory or a database) by pattern execution module 208 for processing and/or distribution. Pattern execution module 208 is configured to execute the rules established by the instruction sequences and serves as an aggregator for all the instruction sequences. Notably, pattern execution module 208 delivers the usage pattern instruction sequences to the virtual cores (e.g., generates an execution sequence for each of the pattern instruction sequences to be processed and/or translated by pattern execution module 208). In some examples, the delivered sage pattern instruction sequences (e.g., execution sequences) may be represented as a timeline to be simulated by one or more of the virtual cores.

Likewise with respect to NTPG 215, upon receiving the network traffic pattern parameters included in network traffic patterns 220, network traffic sequence generator 222 may generate a unique network traffic sequence for each of the plurality of patterns. As used herein, an exemplary network traffic sequence may include a software program and/or object. For example, the network traffic sequence may be embodied in an XML format, a binary format, JavaScript Object Notation (JSON) format, or as file data. Once generated by network traffic sequence generator 222, the network traffic sequences are distributed and forwarded to VNICs 226 for performing network traffic simulation.

Returning to UPG 205, pattern execution module 208 may initiate the distribution and/or loading of the instruction sequences among virtual processing cores $212_{1 \ldots Q}$ of virtual machine 201 for execution of a CPU usage simulation. For example, pattern execution module 208 may implement a round-robin distribution of instruction sequences 210 across virtual processing cores $212_{1 \ldots Q}$. Each of virtual processing cores $212_{1 \ldots Q}$ subsequently executes instruction sequences 210, which in turn simulates CPU usage as originally defined by the user. For example, the CPU usage may be defined via the pre-canned simulation patterns and/or the custom defined patterns managed by a processing activity emulator (e.g., processing activity emulator 102).

By provisioning the instruction sequences across virtual processing cores $212_{1 \ldots Q}$, the selected CPU usage patterns are being emulated on a virtual machine 201 of the DUT. Such a simulation test affords a user the ability to control CPU usage and correlate it to underlying system comprising hardware and/or hypervisor to determine if the system is performing correctly. Notably, the simulation of multiple users utilizing multiple applications based on the number of instruction sequences are being generated and applied to processing cores $212_{1 \ldots Q}$. In some embodiments, the disclosed subject matter is configured to allow a user to simulate multiple CPU usage patterns via profiles (e.g., custom CPU usage patterns) across multiple servers and to monitor the performance level.

As indicated above, pattern execution module 208 may communicate with network traffic sequence generator 222 to synchronize the execution and/or distribution of instruction sequences 210 and the generated network traffic sequences. In particular, pattern execution module 208 and network traffic sequence generator 222 may utilize a communications channel 213 (e.g., an API) to exchange synchronization messages that include activity identifiers and timeline values/tag data. Notably, each of the instruction sequences 210 and the network traffic sequences directed to VNICs 226 include an activity identifier and related timeline tag which can be used by pattern execution module 208 and network traffic sequence generator 222 to coordinate the delivery of the sequences to the processing cores 212 and VNICs 226 in a synchronized manner (e.g., forwarding the sequences with matching timeline values at the time designated by the timeline value/tag).

After the pattern instruction sequences are executed by the virtual processing cores 212, pattern execution module 208 can generate an electronic status report that indicates the state and/or status of execution for all of the executed pattern instruction sequences 208. Notably, pattern execution module 208 may be configured to assess the status of the executed pattern instruction sequence and send the electronic status report reflecting such stats to statistics and reporting module 113). In a similar manner, network traffic sequence generator 222 may be configured to generate an electronic status report that indicates the state and/or status of execution for all of the network traffic sequences handled by VNICs 226. The reports generated by pattern execution module 208 and network traffic sequence generator 222 may then be forwarded to statistics publisher 224. Publisher module 224 may then provide and/or present the collected status information in a visual manner, such as via a graphical user interface (GUI) or a printed report.

Figure 4:
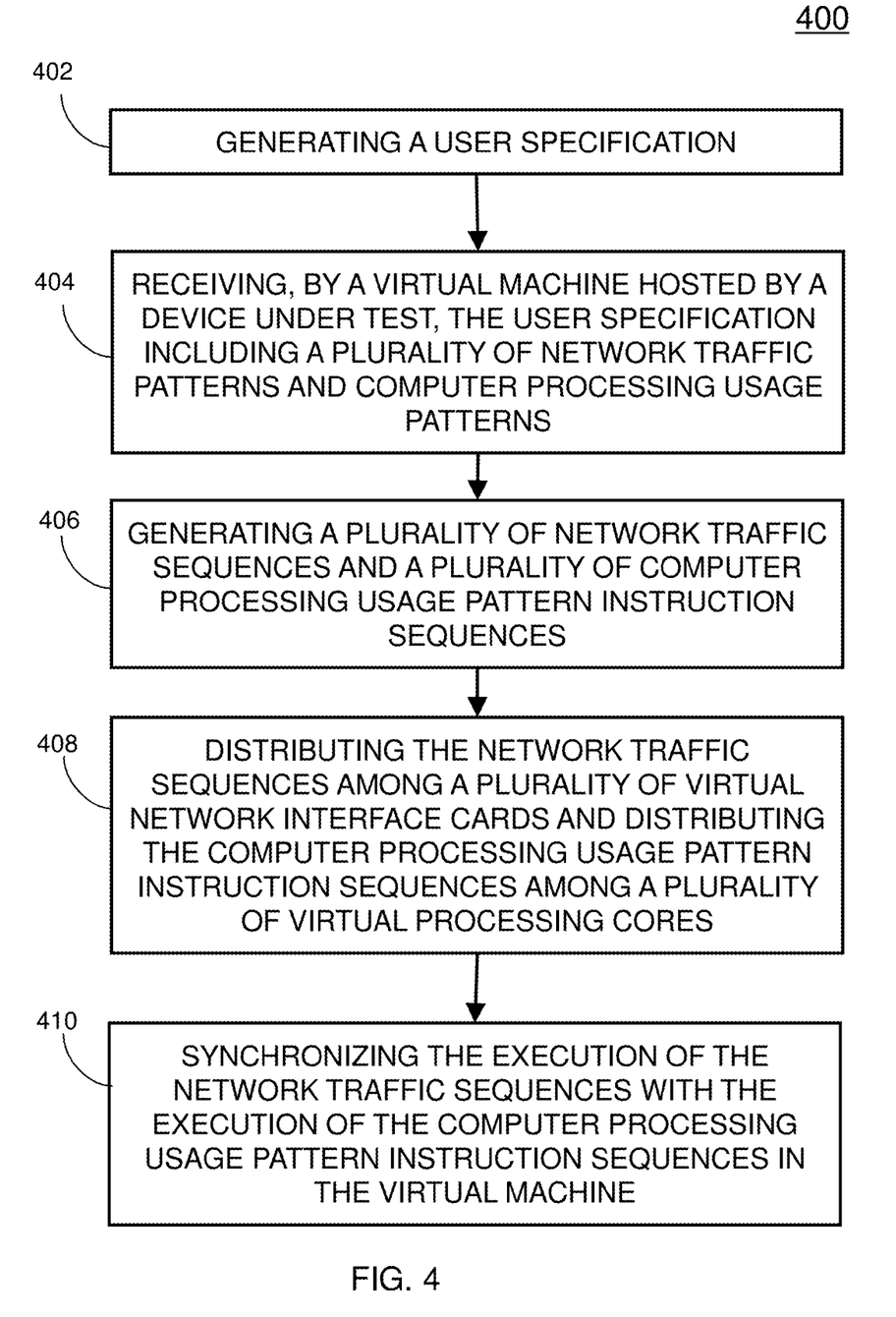
FIG. 4 is a flow chart illustrating an exemplary process for emulating network traffic patterns on a virtual machine in a virtual environment according to an embodiment of the subject matter described herein.

FIG. 4 is a flow chart illustrating an exemplary method 400 for emulating network traffic patterns on a virtual machine according to an embodiment of the subject matter described herein. In step 402, a user specification is generated. Initially, a test system administrator or another user first customizes and/or defines a network traffic pattern specification that may be included in the user specification to be generated. In some embodiments, the network traffic pattern may be based on network traffic measurements taken or captured by specific applications installed on the virtual environment. In some instances, the network traffic pattern may be defined or customized by a user as a graphical representation of communicated network traffic activity over a period of time. For example, a user may define a network traffic pattern (as shown in FIG. 2) to include the ramping up, ramping down, and/or a steady state of network traffic activity displayed on a timeline.

After one or more network traffic patterns are defined by the user as described above, a design module in the processing activity emulator may generate a user specification that includes one or more network traffic pattern specifications and a respective one or more computer processing usage patterns (e.g., CPU usage patterns). In some embodiments, the processing activity emulator may be configured to aggregate the network traffic patterns and the associated computer processing usage patterns into a user specification. The design module may also be configured to forward the generated user specification (including the aggregated network traffic pattern specifications and associated CPU usage specifications) to a provisioning module in the processing activity emulator for distribution to one or more DUTs.

In step 404, a user specification including at least a plurality of network traffic patterns and computer processing usage patterns is received. In some embodiments, a virtual machine hosted by a DUT receives a user specification that includes network traffic pattern specification data as well as computer processing usage pattern specification data (e.g., CPU usage pattern specification data) from the processing activity emulator (via the provisioning module). More specifically, a parser on the network traffic generator receives the user specification (or copy thereof) and subsequently extracts and/or accesses the network traffic specification data included in the user specification. Similarly, a parser on the usage pattern generator receives the user specification (or copy thereof) and subsequently extracts and/or accesses the computer processing usage pattern specification data included in the received user specification.

In some embodiments, each of the parsers in the generators of the virtual machine receives the user specification and extracts the aforementioned patterns to conduct a translation process (e.g., convert the patterns included user specification to a format that is comprehended by the network traffic sequence generator or the pattern instruction sequence generator).

In step 406, a plurality of network traffic sequences based on the network traffic patterns and a plurality of computer processing usage pattern instruction sequences based on the plurality of computer processing usage patterns are generated. In some embodiments, the network traffic sequence generator in the virtual machine processes the network traffic patterns and subsequently generates a pattern instruction sequence for each respective network traffic pattern (containing said execution parameters). Further, a usage pattern generator in the virtual machine processes the computer processing usage patterns to generate computer processing usage pattern instruction sequences in a similar manner.

In step 408, each of the plurality of network traffic sequences are distributed among a plurality of VNICs residing in the virtual machine and each of the plurality of computer processing usage pattern instruction sequences are distributed among a plurality of virtual processing cores in the virtual machine. For example, the network traffic sequence generator may distribute the network traffic sequences among the VNICs in a round-robin fashion, or in accordance with routing rules and/or load-based parameters.

In step 410, the execution of the network traffic sequences is synchronized with the execution of the computer processing usage pattern instruction sequences in the virtual machine. In some embodiments, the distribution and/or execution of network traffic sequences among the plurality of VNICs may be synchronized with the delivery and/or execution of usage pattern instruction sequences managed by the virtual machine's usage pattern execution module. In particular, the simulation synchronization may be conducted and managed via the exchange of messages (e.g., via an API) between the pattern execution module and the network traffic sequence generator. Notably, the execution synchronization facilitates the CPU usage and network traffic simulation of one or more applications hosted on the virtual machine. For example, the pattern execution module and network traffic sequence generator may communicate via an API and exchange messages containing activity identifiers and associated timeline values that can be used to execute and/or deliver the usage pattern instruction sequences (e.g., execution sequences) to the virtual processing cores and network traffic sequences to the VNICs. As such, the operation of the application is emulated by executing the pattern instruction sequences on the virtual processing cores in a manner specified by the execution parameters and directing network traffic to, and executing the same on, the VNICs in a synchronized manner. Further, the performance level of each of the virtual processing cores and VNICs conducting the simulation may be monitored or measured by the statistics and reporting module 113.

It should be noted that processing activity emulator 102, DUT 104, and/or functionality described herein (e.g., see FIG. 1) can constitute a special purpose computing system. Further, processing activity emulator 102, DUT 104, and/or functionality described herein can improve the technological field of simulation testing by emulating CPU usage patterns and network traffic patterns to follow predefined and/or customized user-defined activities or actions, thereby facilitating reliable stress tests in virtual machine environments and subsequently observing the behavior exhibited by individual virtual machines in the virtual machine environment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:
   generating a user specification based on a plurality of network traffic patterns including a plurality of network traffic activities and computer processing usage patterns including a plurality of computer processing usage activities:
   tagging each of the network traffic activities and the computer processing usage activities with an activity pairing identifier and a related time line data value:
   receiving, at a virtual machine hosted by a device under test (DUT), the user specification containing the plurality of network traffic patterns and computer processing usage patterns;
   generating a plurality of network traffic sequences based on the plurality of network traffic patterns and a plurality of computer processing usage pattern instruction sequences based on the plurality of computer processing usage patterns;
   distributing each of the plurality of network traffic sequences among a plurality of virtual network interface cards (VNICs) and distributing each of the plurality of computer processing usage pattern instruction sequences among a plurality of virtual processing cores in the virtual machine;
   emulating an operation of one or more applications on the virtual machine by executing the plurality of network traffic sequences and the computer processing usage pattern instruction sequences; and
   synchronizing the execution of the plurality of network traffic sequences by the plurality VNICs with the execution of the computer processing usage pattern instruction sequences by the plurality of virtual processing cores in the virtual machine by exchanging synchronization messages containing the activity pairing identifiers and the related time line data values over a communication channel existing within the virtual machine.

2. The method of claim 1 wherein each of the plurality of network traffic patterns comprises network traffic activity associated with an execution of simulated user actions associated with the one or more applications.

3. The method of claim 2 further comprising emulating the operation of the one or more applications on the virtual machine by executing the usage pattern instruction sequences on the one or more virtual processing cores in a manner specified by execution parameters included in the computer processing usage patterns.

4. The method of claim 1 wherein the plurality of network traffic patterns and a plurality of computer processing usage patterns are generated by a user.

5. The method of claim 1 further comprising measuring a performance level of i) each of one or more virtual processing cores, ii) file input/output access, or iii) memory usage emulating an operation of an application.

6. A system for emulating computer processing usage patterns on a virtual machine, the system comprising:
a processing activity emulation machine configured to generate a user specification based on at least a plurality of network traffic patterns including a plurality of network traffic activities and computer processing usage patterns including a plurality of computer processing usage activities and to tag each of the network traffic activities and the computer processing usage activities with an activity pairing identifier and a related time line data value, wherein the processing activity emulation machine includes a first processor and a first memory;
a device under test (DUT) that includes a second processor and a second memory that is configured to host one or more virtual machines configured to receive the user specification containing the plurality of network traffic patterns and computer processing usage patterns, wherein each of the one or more virtual machines when executed by the second processor is configured to:
receive the user specification containing the plurality of network traffic patterns and computer processing usage patterns;
generate a plurality of network traffic sequences based on the plurality of network traffic patterns and a plurality of computer processing usage pattern instruction sequences based on the plurality of computer processing usage patterns;
distribute each of the plurality of network traffic sequences among a plurality of virtual network interface cards (VNICs) and distributing each of the plurality of computer processing usage pattern instruction sequences among a plurality of virtual processing cores in the one or more virtual machines;
emulate an operation of one or more applications on the one or more virtual machines by executing the plurality of network traffic sequences and the computer processing usage pattern instruction sequences; and
synchronize the execution of the plurality of network traffic sequences by the plurality VNICs with the execution of the computer processing usage pattern instruction sequences by the plurality of virtual processing cores in the one or more virtual machines by exchanging synchronization messages containing the activity pairing identifiers and the related time line data values over a communication channel existing within the virtual machine.

7. The system of claim 6 wherein each of the plurality of network traffic patterns comprises network traffic activity associated with an execution of simulated user actions associated with the one or more applications.

8. The system of claim 7 further wherein the virtual machine is configured to emulate the operation of the one or more applications by executing the usage pattern instruction sequences on the one or more virtual processing cores in a manner specified by execution parameters included in the computer processing usage patterns.

9. The system of claim 6 wherein the plurality of network traffic patterns and a plurality of computer processing usage patterns are generated by a user.

10. The system of claim 6 wherein the processing activity emulator is further configured to measure a performance level of i) each of one or more virtual processing cores, ii) file input/output access, or iii) memory usage emulating an operation of an application.

11. A non-transitory computer readable medium having stored thereon executable instructions that when executed by a processor of a computer cause the computer to perform steps comprising:
generating a user specification based on a plurality of network traffic patterns including a plurality of network traffic activities and computer processing usage patterns including a plurality of computer processing usage activities;
tagging each of the network traffic activities and the computer processing usage activities with an activity pairing identifier and a related time line data value;
receiving, at a virtual machine hosted by a device under test (DUT), the user specification containing the plurality of network traffic patterns and computer processing usage patterns;
generating a plurality of network traffic sequences based on the plurality of network traffic patterns and a plurality of computer processing usage pattern instruction sequences based on the plurality of computer processing usage patterns; and
distributing each of the plurality of network traffic sequences among a plurality of virtual network interface cards (VNICs) and distributing each of the plurality of computer processing usage pattern instruction sequences among a plurality of virtual processing cores in the virtual machine;
emulating an operation of one or more applications on the virtual machine by executing the plurality of network traffic sequences and the computer processing usage pattern instruction sequences; and
synchronizing the execution of the plurality of network traffic sequences by the plurality VNICs with the execution of the computer processing usage pattern instruction sequences by the plurality of virtual processing cores in the virtual machine by exchanging synchronization messages containing the activity pairing identifiers and the related time line data values over a communication channel existing within the virtual machine.

12. The computer readable medium of claim 11 wherein each of the plurality of network traffic patterns comprises network traffic activity associated with an execution of simulated user actions associated with the one or more applications.

13. The computer readable medium of claim 12 further comprising emulating the operation of the one or more applications on the virtual machine by executing the usage pattern instruction sequences on the one or more virtual processing cores in a manner specified by execution parameters included in the computer processing usage patterns.

14. The computer readable medium of claim 11 wherein the plurality of network traffic patterns and a plurality of computer processing usage patterns are generated by a user.

* * * * *